C. F. HOFFMAN.
Potato Planter.
No. 81,371.
Patented Aug. 25, 1868.
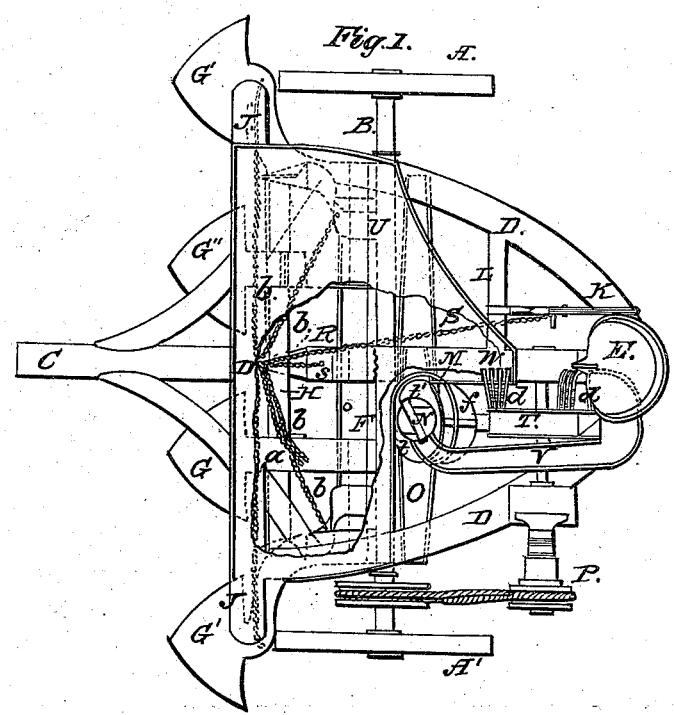
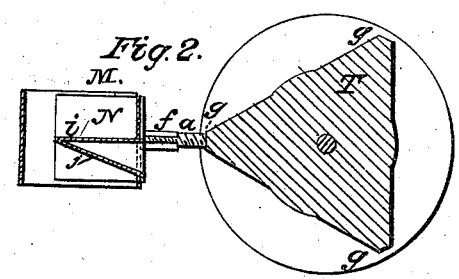
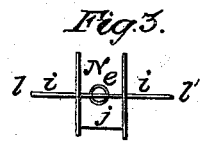
Witnesses.
Inventor.

United States Patent Office.

CHARLES F. HOFFMAN, OF NEW ORLEANS, LOUISIANA.

Letters Patent No. 81,371, dated August 25, 1868.

IMPROVEMENT IN COMBINED POTATO-PLANTER AND CULTIVATOR.

The Schedule referred to in these Letters Patent and making part of the same.

TO ALL WHOM IT MAY CONCERN:

Be it known that I, CHARLES F. HOFFMAN, of the city of New Orleans, parish of Orleans, and State of Louisiana, have invented a certain new and useful Improvement in Potato-Planters and Cultivators; and I do hereby declare the following to be a full, clear, and exact description of the same, reference being had to the annexed drawing, making a part of this specification, in which—

Figure 1 is a plan or top view of my said invention in a complete state, and
Figures 2 and 3 detached views of some of the parts thereof.

The object of my invention is to make the ridges, cut the potatoes, and plant the pieces thereof, in the progress of the machine across the field, at one and the same time, the ground having been previously properly prepared by ordinary plowing and harrowing.

To accomplish the said objects, I employ a variety of mechanical parts, which I arrange and combine in a novel manner for conjoint and simultaneous action. My invention may therefore be said to consist of a machine on two wheels that throws up or makes the ridges, carries the potatoes, cuts the potatoes into pieces, and drops the pieces, at proper intervals apart, into furrows or trenches which it makes in the tops of the ridges, in such a manner that they are instantly covered by the falling in of the earth from the sides of said trenches. To fulfil these functions or objects is the design chiefly of my invention, but when the potatoes are to be harvested, it will dig them with as much facility, and, relatively to existing methods of doing so, with as much economy and saving of time as it planted them, as I shall clearly demonstrate hereafter.

But my invention will be better understood by referring to the drawings, on which the same letters denote the same parts of all the figures.

A A' are the wheels, and B the axle on which the machine is supported, and C the tongue or draught-pole to which the animals by which it is drawn are attached by any usual and proper means or harness. Upon the tongue and axle a framework, D, is secured, which, it will be observed, has in its plan or top outline the form of a truncated ellipse, the cut through the same being transverse to the longest axis of such figure.

To or upon the frame D and the tongue C all the parts of my machine are attached at some point or another.

Just in front of the axle B, a rod, F, is sustained by the two curved sides of the frame D, and to this rod are secured, in such manner as to allow of an articulation at the point of attachment, four double-winged or turning-plows G G''' G'' G', that are sustained by a sufficient number of adjustable chains from the bar J, which said plows subserve the function of throwing up the ridges. Or the rod F may be entirely dispensed with, and the plows, as well as the planting-"shoes," may be hinged, by any proper appliances, directly to the axle of the machine, in such manner that, whether there be a rod, F, or not, the planting-"shoes" may be withdrawn and the plows put in their places whenever the potatoes are to be harvested. The said plows will then bear directly upon and through the centre of the ridges, and plow them down. It is in this way that my machine is equally as well adapted to harvesting as to planting potatoes, or, in other words, is converted from a planting into a digging-machine.

To prevent lateral vibration in these plows G G''' G'' G', and otherwise to steady them, a cross-bar, H, connects their shanks together, as shown. The connection between the bar H and the shanks of the two outside plows G and G' is permanent and fixed, but the shanks of the two inside plows G'' G''' fit into depressions or recess knuckles in the said bar H, and are secured therein by removable pins $a$, which, on being withdrawn, permit of the elevation or depression of these two plows independently of the others. This arrangement allows the driver to use two, three, or all four of the plows at his pleasure.

Fastened to each plow is a small chain, $b$, that converges to and connects with a common central chain, $c$, which, passing through a central loop or pulley of any suitable description, affixed to and underneath the bar J, leads and is secured to a lever, K, which is placed on the right-hand side of the driver's seat E, so that, through its agency and that of the said chains, he can elevate or lower the plows at his will.

The planting-"shoes" R are also connected together by a rod, o, and may be elevated or lowered with the plows by means of the chains s, which connect them with the bar H. The lever K is pivoted to a cross-bar, L, of the frame D, just in front of the driver's seat E, as shown, or to any other proper support.

The whiffle-trees or other draught-appliances are fastened to the bar J. They are not, however, shown on the drawing. Behind and close to the axle B, on the left-hand side of the driver's seat, is the cutting-box or chamber M, in which a peculiarly-constructed knife, N, (see figs. 2 and 3,) operates, and cuts each potato, as it finds its way into said box, into six pieces, and in such a manner that three of the said pieces instantly drop out of the box, and are severally conducted by three conduits O into the planting-"shoes" R, whence they drop into the trenches made by the said "shoes" in the ridges, and, as the machine moves on, these pieces are covered up by the falling earth.

The apertures for the exit of the pieces of potatoes are behind the said planting-"shoes," and hence they cannot be choked or closed up by earth in the operation of the machine.

Near the rear end of the frame D, and on the left-hand side of the driver's seat, a transverse revolving shaft is fixed, the journals of the same being located on the rear end of the tongue C, or adjacent thereto, and a part of the said frame D. On the outer extremity of this shaft is a pulley, P, so adjusted as that it may readily be thrown in and out of gear, which rotates the shaft by means of a cross-cord or other band that passes over a pulley, S, on the hub of the wheel A', and on the inner end of the said shaft is an eccentric, T, from which, not far from the perimeter thereof, on the right-hand side, project three or more sets of wire fingers or cups $d$, whose office it is to scoop up and lift the potatoes, one at a time, from the platform-box U, and carry or drop them into the feeding-trough V, in which they are conducted or glide into the cutting-box M, to be then divided and distributed through the conduits O into the planting-"shoes," and finally into the ridges.

The platform-box U is perforated or otherwise adapted on its bottom for permitting dirt and gravel to pass through the same, so that it can never accumulate therein in any inconvenient quantity, or be carried into the cutting-box, and narrow clefts or slits are made in the left-hand side thereof, near the rear end, and for a little way through the bottom of the said platform-box U, for the passage of the wire fingers $d$.

In the operation or practice of my machine, the potatoes are thrown into the box U, which has a slight inclination towards the rear end of the machine, in order to cause the potatoes to roll into the neck-like projecting part at W, and thus within the reach of the fingers or cups $d$ as they pass alternately through the said clefts and into that part of the box U; each of the sets of the said fingers picking up a potato and carrying it, in and by virtue of the revolution of the eccentric T, into the trough V, at or near its rear end, to be thence taken by its gravity, (the said trough having a proper inclination for such purpose,) into the cutting-box M.

The knife, N, upon its cutting-edge, consists of three blades, two of which cross the other, as shown at fig. 3, so that every potato that comes within its action must be cut into six pieces, three below and three above the horizontal blade $i$, and it is provided with a projecting stem or part, $e$, on which is secured a helical or other suitable spring, $f$, to draw or force back the knife-edges after each cutting, as the points of the eccentric pass from the position, as shown at fig. 2, and no longer press against the stem $e$, in order to create an opening through which the three pieces of potatoes above the edge or blade $i$ may drop, and find their way through their several conduits into the ground, as the three pieces below said blade had done before, and also to permit the next potato to descend into the cutting-box M.

In order to insure with absolute certainty the cutting of the potatoes, the front inner part of the box M is provided with thin cuts corresponding with the cutting-edges of the knife N, into which the said edges penetrate at each cutting about a quarter of an inch.

The cross-slats $t$ arrest the potato as it falls into the box M, and hold it in proper position to be cut by the knife N; the said slats being so placed as not to interfere with the action of the said knife, nor to present any ledge or shelf on which the pieces of potato, when cut, can rest or be caught, and thereby fail to fall out of the box.

The two outer edges of the knife, marked $l\ l'$, work in grooves in the sides of the box M, in order to give the knife steadiness in its reciprocating action, and insure the cutting of the potato with unfailing certainty. The incline part $j$ of the knife N is a device for forcing the lower central piece of the cut potato into its proper conduit by acting upon the same on the principle of a wedge.

The drawing does not present in all its parts the precise proportions of a full-sized working machine, and hence it must be taken as an illustrative and not an exact delineation of my invention, but it contains all the parts, and therefore is sufficient to enable any person skilled in the art to which the invention pertains to construct and use the same.

In some cases I might find it expedient to increase the sets of wire fingers or cups, in order to plant the pieces of potatoes closer together, and in such case to modify the form of the eccentric, T; or I might desire to divide the potato into a larger or smaller number of pieces than six, and hence would be obliged to modify the knife N accordingly.

Having thus described my invention, what I claim, and desire to secure by Letters Patent, is—

1. The eccentric, T, when provided with the wire fingers or cups $d$, and otherwise constructed, as described, in combination with the box U and the feeding-trough V, when these several parts are arranged and operate substantially as described for the purpose set forth.

2. The cutting-box M, when provided with a knife, N, that is constructed and operates substantially as described for the purpose set forth.

3. The eccentric, T, in combination with the trough V, the cutting-box M, and the knife N, when these several parts are constructed and arranged with respect to each other, and operate substantially as herein described for the purpose set forth.

4. The eccentric, T, the cutting-box, M, and the knife N, in combination with the plows G G''' G'' G', and the planting-"shoes" R, when these several parts are constructed, arranged, and conjointly operate substantially in the manner and for the purpose herein set forth.

5. The eccentric, T, and its equivalent, when provided with the wire fingers $d$, in combination with the box $u$, when these parts are arranged for conjoint operation substantially as herein described.

CHARLES F. HOFFMAN.

Witnesses:
   S. C. FISHER,
   H. N. JENKINS.